United States Patent [19]

Siwersson et al.

[11] Patent Number: 4,561,596

[45] Date of Patent: Dec. 31, 1985

[54] APPARATUS FOR SPREADING GRANULAR MATERIAL

[75] Inventors: Olle L. Siwersson, Helsingborg; Arne E. Wall, Landskrona; Kent B. G. Kristensson, Helsingborg, all of Sweden

[73] Assignee: AB Scaniainventor, Helsingborg, Sweden

[21] Appl. No.: 499,755

[22] PCT Filed: Sep. 22, 1982

[86] PCT No.: PCT/SE82/00289

§ 371 Date: May 17, 1983

§ 102(e) Date: May 17, 1983

[87] PCT Pub. No.: WO83/00979

PCT Pub. Date: Mar. 31, 1983

[30] Foreign Application Priority Data

Sep. 23, 1981 [SE] Sweden .................. 8105604

[51] Int. Cl.⁴ .................. E01C 19/20; A01C 17/00
[52] U.S. Cl. .................. 239/687; 222/413; 239/672
[58] Field of Search .................. 239/670, 672, 674, 675, 239/683, 687, 688; 222/412, 413, 241, 242; 198/671

[56] References Cited

U.S. PATENT DOCUMENTS

| 1,107,992 | 8/1914 | Parrish | 239/687 |
| 2,350,476 | 7/1943 | Richey | 239/675 X |
| 2,758,842 | 8/1956 | Burroff | 275/8 |
| 3,041,076 | 6/1962 | Van Der Lely et al. | 239/687 X |
| 3,478,970 | 11/1969 | Siwersson | 239/687 |
| 3,715,119 | 5/1970 | Shelley et al. | 222/413 |

FOREIGN PATENT DOCUMENTS

| 27730 | 4/1971 | Australia | 198/671 |
| 1900801 | 1/1968 | Fed. Rep. of Germany | 198/671 |
| 330100 | 12/1968 | Sweden . | |
| 331002 | 8/1971 | Sweden . | |

Primary Examiner—Andres Kashnikow
Assistant Examiner—Kevin P. Weldon
Attorney, Agent, or Firm—Karl W. Flocks; Sheridan Neimark; A. Fred Starobin

[57] ABSTRACT

An apparatus for spreading granular material, such as fertilizer, has a carriage (1) on which there is mounted a vertical conveyer (5, 6) which comprises a vertical cylindrical housing (5) and a conveyer screw (6) rotatably mounted therein. The screw (6) is rigidly connected at its lower end to an infeed cup (8) and directly connected to a driving mechanism (7) below the cup (8). The cylindrical housing (5) and the screw wing of the screw (6) extend downwardly into the cup (8), and the cylindrical housing has guide means (9) conducting the material inwardly towards the screw blade of the screw. The material is supplied from a supply container (1A) directly down into the cup (8). At its upper end, the screw (6) is non-rotatably connected to its spreader (12) to which the granular material is conveyed via a discharge opening (20) in the cylindrical housing and a distributor disk (21). The effective throughflow area of the distributor disk, as calculated per angular unit in the circumferential direction of the cylindrical housing, varies and is smaller at the beginning and at the end of the discharge opening (20) of the cylindrical housing.

8 Claims, 9 Drawing Figures

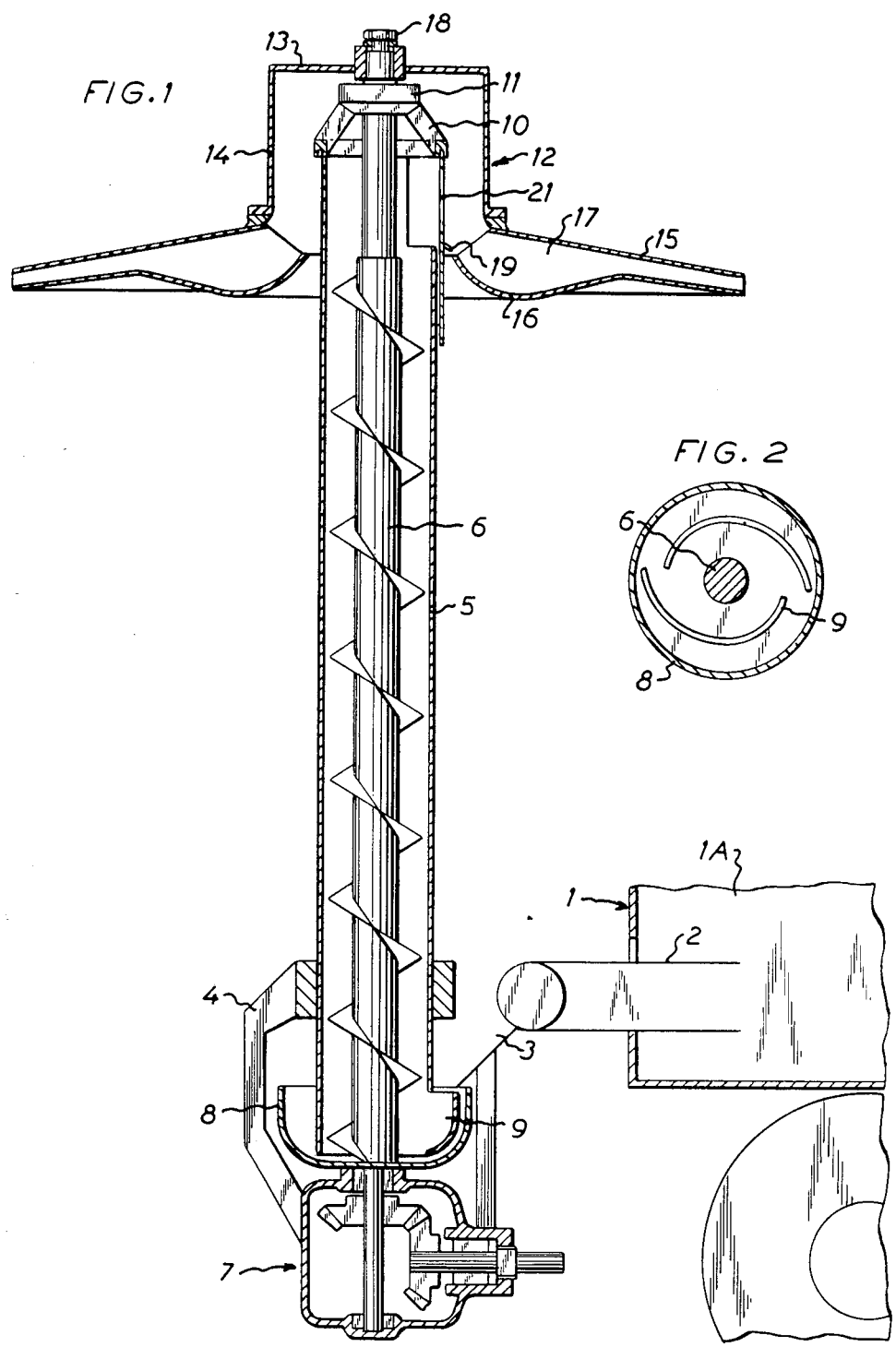

APPARATUS FOR SPREADING GRANULAR MATERIAL

The present invention relates to an apparatus for spreading granular material, such as fertilizer, said apparatus comprising a carriage which is adapted to be driven or drawn across a field and on which there is mounted a vertical conveyer comprising a vertical cylindrical housing and a conveyer screw disposed therein, said vertical conveyer being adapted to convey material from a lower material space to an upper material spreader via a distributor, said cylindrical housing being non-rotatably mounted on the carriage, and the conveyer screw being rigidly connected at its upper end to the spreader.

Swedish patent specification No. 331,002 describes an apparatus which is of the above-mentioned type and which has a screw conveyer comprising a screw and a cylindrical housing, of which in any case the cylindrical housing, but in most cases also the screw is rotated to auger the material upwardly to the spreader which is disposed at the upper end of the apparatus and whose rotary part is rigidly connected to the rotary cylindrical housing and rotates together therewith. The screw conveyer itself is enclosed by a stationary outer tube which serves two purposes; on the one hand it serves as an attachment for the upper mounting location of the rotary parts and, on the other hand, it serves as a holder for a distributor comprised by the spreader. In view hereof, the construction according to this patent specification is complicated and also requires considerable maintenance, and when both the screw and the cylindrical housing are to be rotated, the driving mechanism therefor will be complicated and expensive.

Swedish patent specification No. 330,106 describes another known spreader having a stationary screw and a rotary cylindrical housing, at the upper end of which the spreader unit is mounted for rotation together with the cylindrical housing. However, this prior art construction suffers from the disadvantage that it lacks a separate distributor capable of providing the most advantageous spreading pattern for the material to be spread, such as fertilizer.

U.S. Pat. No. 2,758,842 describes a spreader which has a container into which extends, in a downward direction, a vertical conveyer whose conveyer screw is rigidly connected at its upper end to a rotary spreader for throwing out the granular material. This known apparatus suffers from several disadvantages in that it is unable to give a uniform distribution of the material to be spread, as seen at right angles to the travelling direction of the spreader, and also in that the infeed to the infeed end of the vertical conveyer is unsatisfactory.

The present invention has for its object to obviate the disadvantages of the prior art constructions. According to the invention, this object is achieved in that the screw is rigidly connected at its lower end to a rotary cup-shaped member of a material infeed device to the vertical conveyer, such that the rotary part of the infeed device, the screw and the spreader are rotated together, and that the distributor is adapted to control the flow of granular material from the vertical conveyer to the rotary spreader in such a way that the granular material will be approximately uniformly distributed within the contemplated spreading area after the carriage.

By designing the spreader in accordance with the present invention, considerable advantages are obtained in that all movable parts are driven by the same driving mechanism, and that the distributor can be designed as a replaceable distributor disk, the throughflow openings of which can be designed and spaced in such a manner that the spread granules are discharged more sparsely, as seen in the radial sense from the spreader, at the beginning and at the end of the angular area behind the carriage, within which area the granules are thrown out by the spreader. A further advantage is that no separate supporting means for the distributor disk are required, and that the distributor disk can be secured directly on the stationary cylindrical housing and formed in such a manner that it is possible to adjust the angular position, as seen in the circumferential direction of the cylindrical housing, of the distributor disk and, consequently, also of the angular area behind the carriage, within which the granules are thrown out by the spreader.

The invention will be described in more detail below, reference being had to the accompanying drawings in which FIG. 1 illustrates diagrammatically and partly in section a spreader according to the present invention;

FIG. 2 is a section along line II—II in FIG. 1, some of the parts having been removed;

Figure 3:
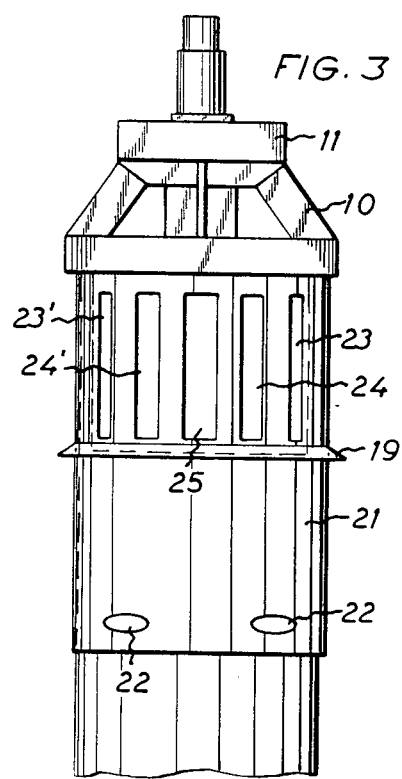
FIG. 3 is a view along line III—III in FIG. 1, a spreader comprised by the apparatus having been removed.

FIG. 1 shows the rear end of a carriage 1 having a supply container 1A for granular material which is to be spread and which, by means a belt conveyer 2 driven by one of the carriage wheel axles, is supplied to a hopper 3 conducting it to a vertical conveyer which comprises a cylindrical housing 5 rigidly secured to the carriage by means of a frame 4, and a conveyer screw 6 mounted rotatably within the cylindrical housing. The screw 6 is connected to a transmission 7 which is connected to the power take-off of a tractor, such that the screw will rotate within the cylindrical housing when the carriage is moving. At its lower end, in the region of the hopper 3, the screw is rigidly connected to a cup 8. The driving end of the screw extends through the bottom of the cup 8 which thus rotates together with the screw and contains the lower end of the cylindrical housing 5. Guide means 9 are so arranged within the cup 8 that any material piling up at the inner cup surface will be guided inwardly towards the lower end of the cylindrical housing 5 where it is caught by the screw 6 and augered upwardly. The guide means 9 are stationary and, in the embodiment illustrated, are secured to the cylindrical housing 5.

Figure 4:
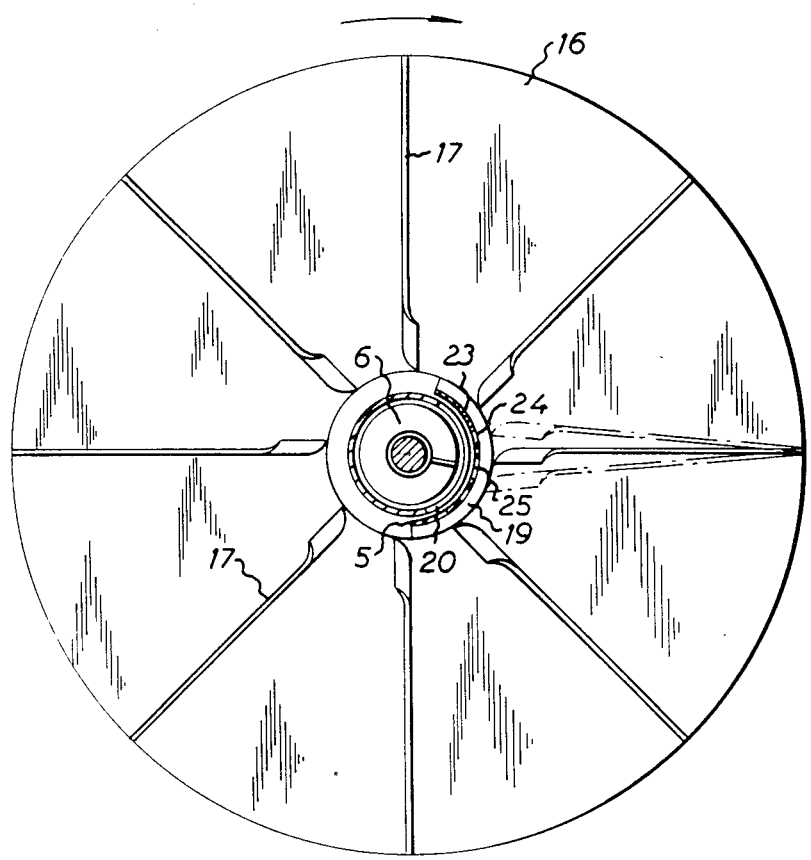
FIG. 4 is a section along line IV—IV in FIG. 1.

A holder 10 for a rotary bearing 11 is rigidly connected to the cylindrical housing 5. At its upper end, the screw 6 is rotatably mounted in the rotary bearing 6 and rigidly connected to a spreader 12. The spreader comprises on the one hand a disk 13 which is non-rotatably keyed to the screw shaft and, on the other hand, a downwardly open hood 14 which, as its upper peripheral edge, is secured to the disk 13 and, at its lower peripheral edge, to a conical upper spreader disk 15, for instance by means of bolts. The spreader 12 also comprises a lower spreader disk 16 and a number of guide means 17 connecting the upper spreader disk to the lower spreader disk and extending radially outwardly towards the outer peripheral edge of the spreader 12. The guide means 17 may, as has been indicated for one of the guide means in FIG. 4, be inclined in one or the other direction, if this should be more advantageous for the granular material to be spread. As will appear from FIG. 1, the lower spreader disk 16 is formed with a circumferential valley at its inner end so that the material discharged by the conveyer, when thrown outwardly under the action of centrifugal force, is caused to bounce against the upper disk 15 before it is discharged through the gap between the two disks 15, 16. In this manner, the uniform flow of the material will be further enhanced. The spreader 12 is clamped to the upper end of the screw by means of a nut 18. Details 12-13 thus are fixedly secured to the screw 6 and will rotate together with the screw when this is driven.

Figure 9:
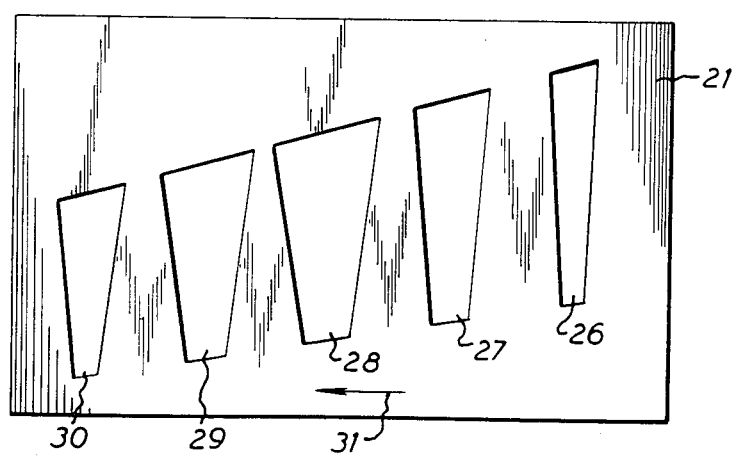
FIG. 9 shows an alternative design of a distributor disk comprised by the apparatus, before the disk is bent to the intended shape.

To control the flow of granular material, such as fertilizer, to the spreader 12, and to control the spreading angle and, above all, the spreading uniformity, as seen at right angles to the direction of travel of the carriage 1, the cylindrical housing is provided at its upper end with an outlet 20 which is covered by a distributor disk 21. The distributor disk is arcuate and has elongate openings 22 for fixing bolts screwed into the cylindrical housing 5. The distributor disk 21 has a number of slots 23-25 of different width and distribution. The shape, width and distribution of the slits or recesses 23-25 can be varied if it is desired to change the spreading pattern or if this pattern has to be adapted to specific spreading characeristics of the granular material. An intercepting ledge 19 is provided below the openings 23-25 to minimize the risk of granules dropping through the gap between the cylindrical housing 5 and the lower distributor disk 16. A further example of a distributor disk 21 is shown in FIG. 9 in which the openings 26-30 have a downward taper and, besides, are disposed at different levels such that their lower edges are inclined downwardly in the direction of the arrow 31. The arrow 31 indicates the direction of rotation of the screw 6. The reason why the lower edges of the openings 26-30 are disposed at successively lower levels in the embodiment according to FIG. 9 is that the column of granular material augered upwardly by the screw 6 has a greater height at the beginning of the series of holes 26-30 and obtains a successively lower height, according as the material is discharged through the openings 26-30 when the column of granular material is rotated by the screw.

The openings 23-30 in the distributor disk 21 may be disposed within an angular area of, for example, 140° and approximately in the direction towards the front end of the carriage 1. The discharged granules will therefore move outwardly along the guide means 17 under the action of the centrifugal force, and the granules discharged through the openings 23 (FIG. 3) will be the first to leave the spreader 12, whereas the granules discharged through the opening 23' (FIG. 3) will be the last to leave the spreader 12. When the carriage is being driven across the field, the granules will be spread within a strip-shaped spreading area. Since the granules are thrown out behind the carriage 1 in the form of a shower shaped like a circular sector, the spreading density, as seen as right angles to the direction of travel of the carriage, would be higher along the outer edges of the strip-shaped spreading area if one did not design the distributor disk 21 in the manner indicated, i.e. unless the supply of granules at the beginning and the end of the circular sector-shaped material shower is reduced.

The apparatus according to the invention operates as follows: The granular material, the fertilizer, is transferred from the supply container 1A to the cup 8 of the infeed device by the conveyer belt 2 and the hopper 3. Thus, all granular material is conveyed directly into the cup 8, for which reason no jamming occurs, as would have been the case if the infeed device had been operating directly within the supply container 1A. Since the cup 8 rotates with the screw, the material is rotated and will then be caught by the guide means 9 which direct the material towards the infeed end of the screw, in this manner, the screw conveyer 5, 6 will have a very high degree of filling, which gives low energy costs for the upward movement of the material. At the upper end of the screw conveyer 5, 6, the granules are discharged through the openings 23-25 of the distributor disk. Under the action of the centrifugal force, the granules move outwardly and reach the outer edge after a given period of time, i.e. after a given angular movement of the spreader. The expert can readily ascertain where the discharge opening 20 should be placed in the circumferential direction of the cylndrical housing. In the embodiment illustrated, the hole 20 is directed approximately forwardly in the direction of travel so that the main part of the material supplied will be thrown out from the spreader within an angle of for instance 170°, directed rearwardly in relation to the direction of travel of the carriage.

Figure 5:
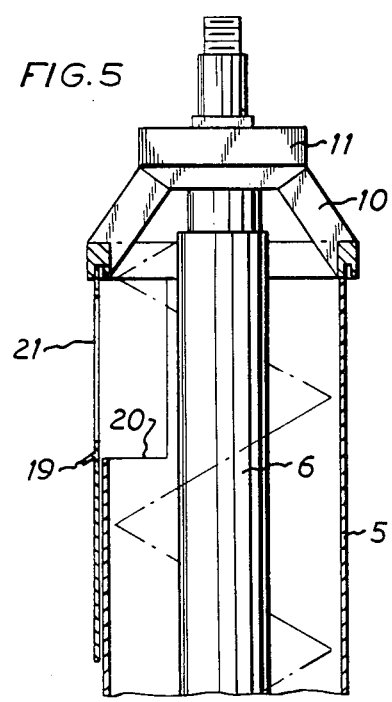
FIGS. 5–8 show alternative designs of the vertical conveyer on a level with a distributor disk comprised by the apparatus.
Figure 6:
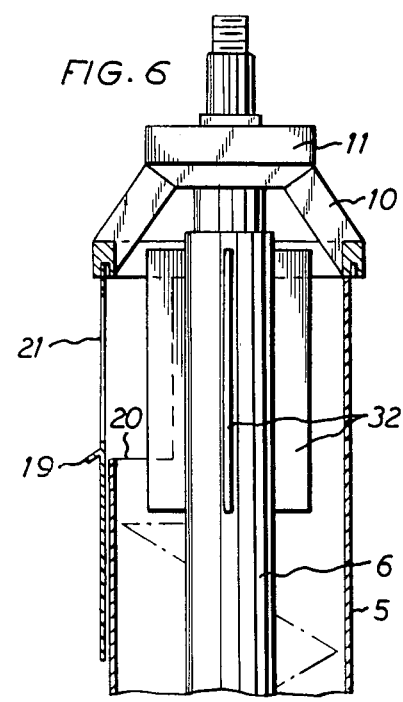
Figure 7:
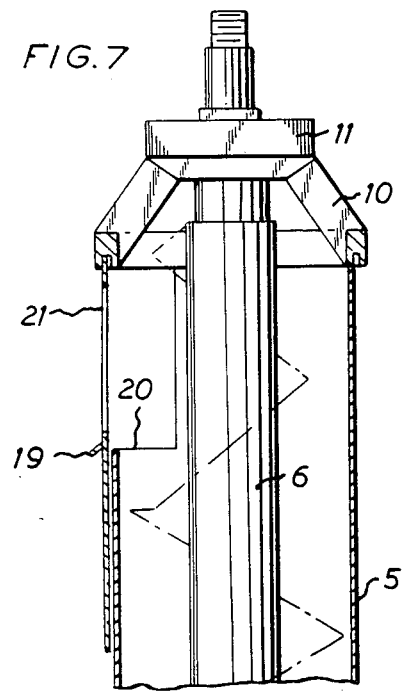
Figure 8:
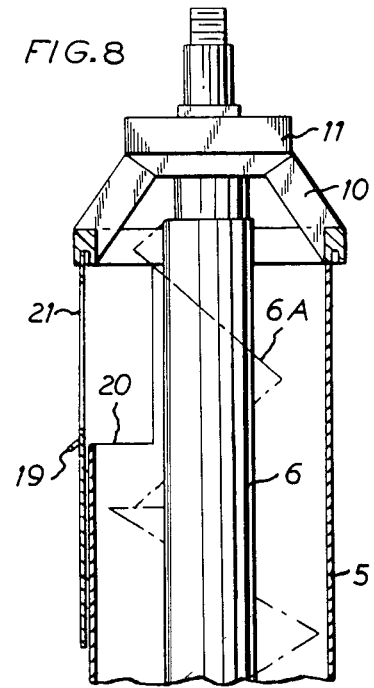

In the embodiment according to FIG. 1, the screw blade of the screw 6 terminates directly below the opening 20, as a result of which the granular material will be urged upwardly within the area of the opening 20 in the form of a continuous column. The screw blade may also extend all the way up to the holder 10. FIG. 5 shows such a variant, where the screw blade has the same radius along the entire length of the screw. Such a variant is shown also in FIG. 7, but here the screw wing has a smaller radius on a level with the opening 20. FIG. 6 shows another embodiment in which four radially directed stirring blades 32 are provided on a level with the opening 20. FIG. 8 shows a further embodiment in which a so-called counterscrew 6A, i.e. a screw wing of opposed feeding direction, is disposed on a level with the opening 20, such that the granular material will be positively urged out through the opening 20 and the openings 23-25 of the distributor disk 21. In all embodiments, the cylindrical housing 5 is open in the upward direction in that the holder 10 affords free passages to the spreader 12. If, for some reason, the openings 23, 30 in the distributor disk 21 should become clogged, the granular material will still flow out into the spreader 12 so that the vertical conveyer cannot be damaged. The driver of the carriage 1 will immediately become aware of such overflow of material to the spreader 12 because the material in that case will be spread through 360° all around the spreader.

We claim:

1. An apparatus for spreading granular material, such as fertilizer, said apparatus comprising a carriage which is adapted to be moved across a field and on which there is mounted a vertical conveyer (5,6) comprising a vertical cylindrical housing (5) and a conveyer screw (6) disposed therein, said vertical conveyer being adapted to convey material from a lower material space (3) to an upper material spreader (12) via a distributor (21), said cylindrical housing (5) being non-rotatably mounted on the carriage, and the conveyer screw (6) being rigidly connected at its upper end to the spreader (12), said screw being rigidly connected at its lower end to a rotary cup-shaped member (8) of a material infeed device (8,9) to the vertical conveyer (5,6), such that the rotary part (8) of the infeed device (8,9), the screw (6) and the spreader (12) are rotated together, said distributor (21) being adapted to control the flow of granular material from the vertical conveyer (5,6) to the rotary spreader (12) in such a way that the granular material will be approximately uniformly distributed within the contemplated spreading area after the carriage (1), said distributor (21) being a distributor disk (21) which is mounted over a discharge opening (20) provided in the cylindrical housing (5) and being of limited extent in the circumferential direction of the cylindrical housing, and which has a plurality of throughflow openings (23-25, 26-30), the effective throughflow area of said discharge openings, as calculated per angular unit in the circumferential direction of the cylindrical housing, varying in the widths of the openings and being smaller in width adjacent the sides of the discharge opening (20) of the cylindrical housing.

2. An apparatus as claimed in claim 1, characterised in that the openings (26-30) of the distributor disk (21) are disposed at successively lower levels, as seen in the direction of rotation of the screw (6).

3. An apparatus as claimed in claim 1, characterised in that the distributor disk (21) is adjustably mounted on the cylindrical housing (5) for adjustment in different positions in the circumferential direction of the cylindrical housing.

4. An apparatus as claimed in claim 1, characterised in that the cylindrical housing (5) of the screw conveyer (5, 6) extends down into the cup-shaped member (8), and that the infeed device (8, 9) comprises at least one guide means (9) which is stationary relative to the cylindrical housing (5) and adapted to conduct the granular material inwardly towards the screw (6).

5. An apparatus as claimed in claim 1, characterised in that the lower end of the screw (6) extends through the rotary cup-shaped member (8) of the infeed device down to the screw driving mechanism (7).

6. An apparatus as claimed in claim 1, characterised in that the distributor disk (21) is exchangeable.

7. An apparatus as claimed in claim 1, characterized in that the through flow openings adjacent the sides of the discharge opening (20) are more sparsely disposed than central openings in the discharge opening (20).

8. An apparatus as claimed in claim 1, characterised in that the openings adjacent the sides of the discharge opening are narrower than a central opening at the center of the discharge opening.

* * * * *